United States Patent
Lee et al.

(10) Patent No.: US 11,374,282 B2
(45) Date of Patent: Jun. 28, 2022

(54) BATTERY MODULE PROVIDED WITH END FRAME

(71) Applicant: LG CHEM, LTD., Seoul (KR)

(72) Inventors: Jung-Hoon Lee, Daejeon (KR); Hang-June Choi, Daejeon (KR); Dal-Mo Kang, Daejeon (KR); Kyung-Mo Kim, Daejeon (KR); Jeong-O Mun, Daejeon (KR); Jin-Yong Park, Daejeon (KR); Ho-June Chi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 128 days.

(21) Appl. No.: 16/494,031

(22) PCT Filed: Oct. 31, 2018

(86) PCT No.: PCT/KR2018/013132
§ 371 (c)(1),
(2) Date: Sep. 13, 2019

(87) PCT Pub. No.: WO2019/107764
PCT Pub. Date: Jun. 6, 2019

(65) Prior Publication Data
US 2021/0126313 A1    Apr. 29, 2021

(30) Foreign Application Priority Data

Nov. 29, 2017  (KR) .................. 10-2017-0161954

(51) Int. Cl.
*H01M 50/207*  (2021.01)
*H01M 50/249*  (2021.01)
(Continued)

(52) U.S. Cl.
CPC ..... *H01M 50/207* (2021.01); *H01M 10/0468* (2013.01); *H01M 50/244* (2021.01); *H01M 50/249* (2021.01); *H01M 2220/20* (2013.01)

(58) Field of Classification Search
CPC ............ H01M 50/207; H01M 50/249; H01M 50/244; H01M 10/0468; H01M 2220/20
(Continued)

(56) References Cited

U.S. PATENT DOCUMENTS

2004/0219037 A1   11/2004  Higuchi et al.
2010/0178548 A1    7/2010  Baek
(Continued)

FOREIGN PATENT DOCUMENTS

CN        1498311 A     5/2004
CN      101012523 A     8/2007
(Continued)

OTHER PUBLICATIONS

International Search Report issued in PCT/KR2018/013132 (PCT/ISA/210), dated Apr. 10, 2019.
(Continued)

*Primary Examiner* — Jonathan G Jelsma
*Assistant Examiner* — Omar M Kekia
(74) *Attorney, Agent, or Firm* — Birch, Stewart, Kolasch & Birch, LLP

(57) ABSTRACT

A battery module which includes a cell assembly having a plurality of secondary batteries; a module housing having at least one side wall and configured to accommodate the cell assembly in an internal space defined by the at least one side wall; and an end frame including: a body frame that includes a main wall and at least one side wall extending from an outer circumference of the main wall in a direction where the module housing is positioned; and a coupling plate that is configured such that one side portion of the coupling plate (Continued)

is combined and fixed to the at least one side wall of the body frame and the other side portion of the coupling plate is combined to a front end portion or a rear end portion of the module housing.

10 Claims, 11 Drawing Sheets

(51) Int. Cl.
    *H01M 50/244*     (2021.01)
    *H01M 10/04*     (2006.01)
(58) Field of Classification Search
    USPC .......................................................... 429/99
    See application file for complete search history.

(56) References Cited

U.S. PATENT DOCUMENTS

| | | |
|---|---|---|
| 2011/0151730 A1 | 6/2011 | Kim et al. |
| 2013/0183571 A1 | 7/2013 | Miyazaki et al. |
| 2014/0000957 A1 | 1/2014 | Lee et al. |
| 2017/0040575 A1 | 2/2017 | Bang |
| 2017/0117514 A1 | 4/2017 | Yamada et al. |
| 2017/0216956 A1 | 8/2017 | Kotschote et al. |
| 2017/0268549 A1 | 9/2017 | Pyun et al. |
| 2018/0069219 A1 | 3/2018 | Chujo et al. |
| 2018/0138565 A1 | 5/2018 | Lee et al. |
| 2018/0190952 A1* | 7/2018 | Kim ................... H01M 50/20 |
| 2018/0212212 A1* | 7/2018 | Cao ................... H01M 50/256 |
| 2018/0343331 A1 | 11/2018 | Jaegal et al. |

FOREIGN PATENT DOCUMENTS

| | | |
|---|---|---|
| CN | 102104175 A | 6/2011 |
| CN | 103386735 A | 11/2013 |
| CN | 106654103 A | 5/2017 |
| CN | 106660162 A | 5/2017 |
| CN | 206288077 U | 6/2017 |
| EP | 2 958 185 A1 | 12/2015 |
| JP | 2001-93497 A | 4/2001 |
| JP | 2002-75293 A | 3/2002 |
| JP | 2010-165879 A | 7/2010 |
| JP | 2014-179237 A | 9/2014 |
| JP | 2017-27796 A | 2/2017 |
| JP | 2017-201587 A | 11/2017 |
| KR | 10-2002-0041627 A | 6/2002 |
| KR | 10-1305224 B1 | 9/2013 |
| KR | 10-2013-0140245 A | 12/2013 |
| KR | 10-2014-0053656 A | 5/2014 |
| KR | 10-2014-0137044 A | 12/2014 |
| KR | 10-2016-0149791 A | 12/2016 |
| KR | 10-2017-0017514 A | 2/2017 |
| KR | 10-2017-0030954 A | 3/2017 |
| KR | 10-2017-0036639 A | 4/2017 |
| WO | WO 2015/151869 A1 | 10/2015 |
| WO | WO 2016/076056 A1 | 5/2016 |

OTHER PUBLICATIONS

English language translation of KR-10-2014-0053656-A published May 8, 2014.
European Search Report for Application No. 18883426.1 dated Jun. 30, 2020.
Indian Office Action issued in corresponding Indian Application No. 202017016078, dated Aug. 2, 2021 with an English translation.

* cited by examiner

BATTERY MODULE PROVIDED WITH END FRAME

TECHNICAL FIELD

The present disclosure relates to a battery module including an end frame, and more particularly, to a battery module having improved weldability with respect to connection between a module housing and an end plate.

The present application claims priority to Korean Patent Application No. 10-2017-0161954 filed on Nov. 29, 2017 in the Republic of Korea, the disclosures of which are incorporated herein by reference.

BACKGROUND ART

Currently commercialized secondary batteries include nickel cadmium batteries, nickel hydrogen batteries, nickel zinc batteries, lithium secondary batteries, etc. and the lithium secondary batteries thereamong are receiving attention according advantages of free charging/discharging, a very low self-discharge rate, and high energy density since a memory effect is barely generated compared to nickel-based secondary batteries.

Such a lithium secondary battery mainly uses a lithium-based oxide and a carbon material respectively as a positive electrode active material and a negative electrode active material. The lithium secondary battery includes an electrode assembly, in which a positive electrode plate and a negative electrode plate on which the positive electrode active material and the negative electrode active material are respectively coated are arranged with a separator therebetween, and an exterior material, i.e., a battery pouch exterior material, sealing and accommodating the electrode assembly with an electrolyte solution.

Generally, the lithium secondary battery may be classified into a can-type secondary battery, in which the electrode assembly is embedded in a metal can, and a pouch-type secondary battery, in which the electrode assembly is embedded in a pouch of an aluminum laminate sheet, according to a shape of the exterior material.

Recently, the secondary battery is widely used not only in a small-sized apparatus, such as a portable electronic device, but also in medium- and large-sized apparatuses, such as a vehicle or an energy storage apparatus. When the secondary battery is used in the medium- and large-sized apparatuses, a large number of secondary batteries are electrically connected to increase capacity and output. In particular, the pouch-type secondary battery is mostly used in such medium- and large-sized apparatuses due to easy stacking.

Meanwhile, in the related art, in a configuration of a battery module, a module housing accommodating a plurality of secondary batteries, and a front end plate and a rear end plate configured to seal the front and the rear of the module housing.

Here, when the module housing is integrally manufactured, an extrusion method is mainly used. On the other hand, since various components are mounted on the front end plate and the rear end plate, the front end plate and the rear end plate are required to have complicated shapes, and accordingly, a die-casting method is generally used.

However, since there are irregular pores inside the front end plate and rear end plate manufactured via the die-casting method, when the front end plate and the rear end plate are welded to an end portion of the module housing via laser so as to seal the module housing, rupture or breakage may occur during the welding with the module housing, welding condition setting is difficult due to low internal uniformity, and a large number of welding failures may be induced.

Accordingly, when a front end plate and a rear end plate applied to a conventional battery module are manufacture via a press method, it is difficult to realize a complicated shape, and thus there is a limit to mounting various components on or assigning a function to a plate.

In this regard, a technology for solving such issues of the related art described above is required.

DISCLOSURE

Technical Problem

The present disclosure is designed to solve the problems of the related art, and therefore the present disclosure is directed to providing a battery module having improved weldability with respect to connection between a module housing and an end plate.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module including: a cell assembly including a plurality of secondary batteries; a module housing including at least one side wall and configured to accommodate the cell assembly in an internal space defined by the at least one side wall; and an end frame including: a body frame that includes a main wall and at least one side wall extending from an outer circumference of the main wall in a direction where the module housing is positioned; and a coupling plate that is configured such that one side portion is combined and fixed to the at least one side wall of the body frame and the other side portion is combined to a front end portion or a rear end portion of the module housing.

Also, the coupling plate may include a body portion combined to the at least one side wall of the body frame, and a stepped portion having a step with respect to the body portion and extending from a side end portion of the body portion to be adhered to an inner surface of the module housing.

Moreover, at least one fixing protrusion protruding in a direction where the stepped portion is positioned may be formed at an inner surface of the module housing, which faces the stepped portion.

Also, at least one fixing groove recessed such that the fixing protrusion of the module housing is inserted may be formed at the stepped portion.

In addition, the stepped portion may extend to be inclined from the body portion of the coupling plate in a direction where the inner surface of the module housing is positioned such as to pressurize the inner surface of the module housing.

Also, at least one fixing hole may be formed at the body portion of the coupling plate such that one region of the at least one side wall of the body frame is embedded.

Moreover, a recessed portion, in which one region of an outer surface is recessed in an inward direction and a recessed region extends from one end to the other end, may be formed at the body portion of the coupling plate.

Also, an embedded fixing portion, in which a portion of the at least one side wall of the body frame is embedded in the recessed portion, may be formed.

Further, the recessed portion may be formed on a side end portion of the body portion, which is not in contact with the stepped portion.

Also, the recessed portion may extend from the center of the body portion of the coupling plate to both end portions.

In another aspect of the present disclosure, there is also provided a battery pack including at least one battery module.

In another aspect of the present disclosure, there is also provided a vehicle including the battery pack.

Advantageous Effects

According to an aspect of the present disclosure, in a coupling plate included in a battery module, a body portion having a relatively wide surface than a side portion is combined with one side wall of a body frame, and thus the coupling plate may be combined with the body frame with high combining force.

Also, according to an aspect of the present disclosure, by combining a fixing protrusion of a module housing and a fixing groove of a stepped portion, a coupling plate may be guided to be positioned at a proper position of an inner surface of the module housing, and thus an installation process is facilitated and welding between the stepped portion and the module housing is further facilitated, thereby increasing welding reliability.

Moreover, according to such an aspect of the present disclosure, by manufacturing a body frame via a casting method without having to separately use a coupling member, the coupling plate and the body frame may be coupled with strong binding. Accordingly, in the present disclosure, not only manufacturing costs are reduced by reducing the number of components, but also a coupling work may be omitted, and thus manufacturing time may be reduced and a stable combining structure may be formed.

Also, according to an aspect of the present disclosure, by forming an embedded fixing portion on an outer surface of a coupling plate integrally with a body frame, detachment of the coupling plate from the body frame may be effectively prevented as a stepped portion is pressurized in a center direction of an end frame when the coupling plate is inserted into a module housing.

Moreover, according to an aspect of the present disclosure, since a slit or welding guide line formed on a module housing effectively transfers heat to a stepped portion of a coupling plate during a welding process between the stepped portion of the coupling plate and the module housing, a time of the welding process may be effectively reduced and connecting reliability may be increased.

Also, in the related art, when a front end plate or a rear end plate manufactured via a casting method is welded and combined to a module housing, irregular pores exist inside a plate, and thus rupture or breakage may occur during welding, thereby causing welding failures.

However, according to an aspect of the present disclosure, since a body frame of the present disclosure having a complicated structure is formed via a casting method and a coupling plate is formed by pressing or extrusion method instead of the casting method to be welded and combined to a module housing, a defect generated during welding and combining processes between the module housing and an end frame may be effectively reduced and weldability may be improved.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
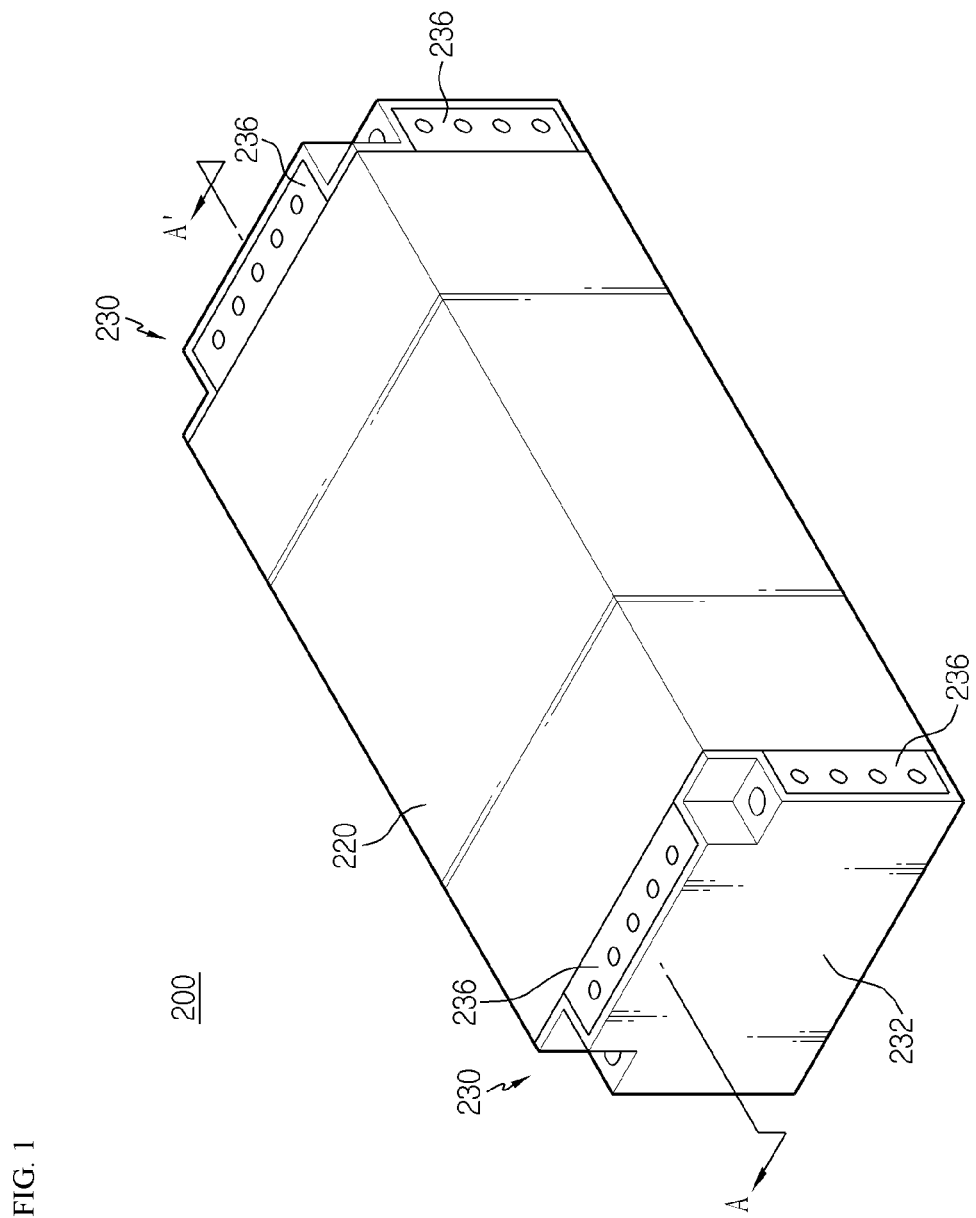
FIG. 1 is a perspective view schematically showing a battery module according to an embodiment of the present disclosure.

FIG. 1 is a perspective view schematically showing a battery module according to an embodiment of the present disclosure. Also, FIG. 2 is an exploded perspective view schematically showing isolated components with respect to a battery module, according to an embodiment of the present disclosure.

Figure 2:
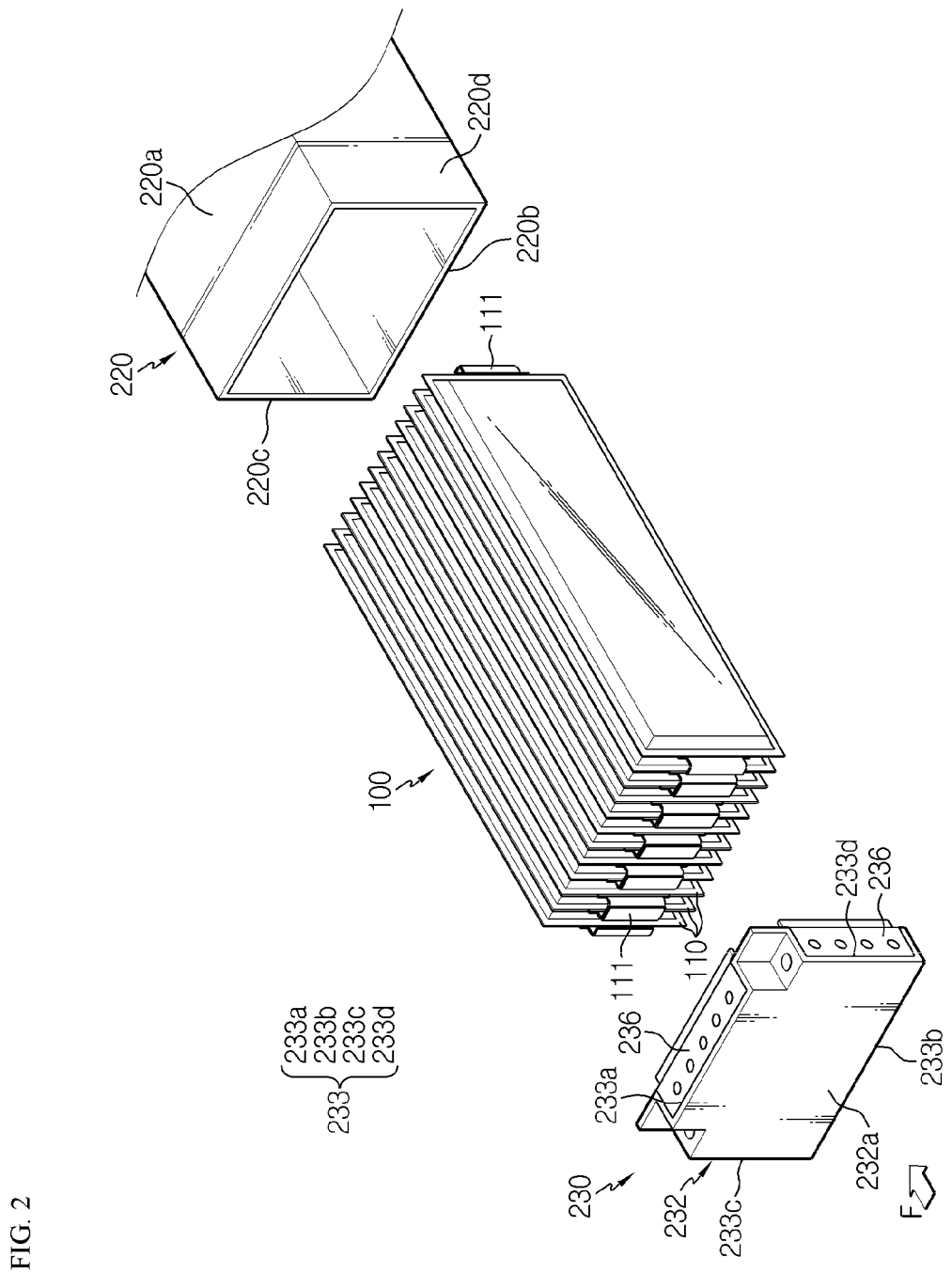
FIG. 2 is an exploded perspective view schematically showing isolated components with respect to a battery module, according to an embodiment of the present disclosure.

Referring to FIGS. 1 and 2, a battery module 200 according to an embodiment of the present disclosure includes a cell assembly 100, a module housing 220, and an end frame 230.

Here, the cell assembly 100 may include a plurality of secondary batteries 110. Also, the secondary battery 110 may be a pouch type secondary battery 110. In particular, such a pouch type secondary battery 110 may include an electrode assembly, an electrolyte solution, and a pouch exterior material.

Here, the electrode assembly may be configured such that one or more positive electrode plates and one or more negative electrode plates are arranged with a separator therebetween. In particular, the electrode assembly may be classified into a winding type in which one positive electrode plate and one negative electrode plate are wound together with a separator and a stack type in which a plurality of positive electrode plates and a plurality of negative electrode plates are alternately stacked with a separator therebetween.

The pouch exterior material may include an external insulating layer, a metal layer, and an internal adhesive layer. Such a pouch exterior material may include a metal thin film, such as an aluminum thin film, so as to protect internal components, such as the electrode assembly, the electrolyte solution, etc., and improve heat dissipation and complementation with respect to electrochemical properties of the electrode assembly and the electrolyte solution. Such an aluminum thin film may be disposed between insulating layers formed of an insulating material so as to secure electric insulation between components inside the secondary battery 110, such as the electrode assembly and the electrolyte solution, and other components outside the secondary battery 110.

In particular, the pouch exterior material may be configured of two pouches, and at least one thereof may have an internal space having a concave shape. The electrode assembly may be accommodated in such an internal space of the pouch. Also, sealing portions are provided on outer circumferential surfaces of the two pouches and are welded to each other, thereby sealing the internal space where the electrode assembly is accommodated.

Each pouch type secondary battery 110 may include an electrode lead 111, and the electrode lead 111 may include a positive electrode lead and a negative electrode lead.

In particular, the electrode lead 111 may protrude forward or backward from the sealing portion positioned on the outer circumferential surface at the front or back of the pouch exterior material. Also, the electrode lead 111 may function as an electrode terminal of the secondary battery 110. For example, as shown in FIG. 2, one electrode lead 111 may protrude forward from the secondary battery 110, and the other electrode lead 111 may protrude backward from the secondary battery 110.

As such, according to such a configuration of the present disclosure, there is no interference between the positive electrode lead and the negative electrode lead in one secondary battery 110, and thus the area of the electrode lead 111 may be increased and a welding process between the electrode lead 11 and a bus bar or the like may be facilitated.

Also, a plurality of the pouch type secondary batteries 110 may be included in the battery module 200 and stacked in at least one direction. For example, as shown in FIG. 2, the plurality of pouch type secondary batteries 110 may be stacked in parallel in a left-and-right direction. Here, when viewed from a direction indicated by an arrow F, each pouch type secondary battery 110 may be arranged to be perpendicularly erected approximately on the ground such that two wide areas are respectively positioned at the left and the right and a sealing portion is positioned at top, bottom, front, and back. In other words, each secondary battery 110 may be erected in an up-and-down direction.

Meanwhile, in the present specification, the terms indicating directions, such as up, down, left, right, front, and back, may vary according to a position of a target object, a position of an observer, or the like. However, in the present specification, for convenience of description, up, down, front, back, left, and right directions are based on the direction indicated by the arrow F.

Since the configuration of the pouch type secondary battery 110 described above is obvious to one of ordinary skill in the art, further detailed descriptions thereof will be omitted herein. Also, the cell assembly 100 according to the present disclosure may employ various secondary batteries 110 well-known at the time of application of the present disclosure.

Meanwhile, the module housing 220 may function as an exterior material with respect to the battery module 200. Accordingly, the module housing 220 may provide structural stability to the battery module 200 and protect components accommodated therein, such as the cell assembly 100, from an impact or another external physical element, such as a foreign substance. In this regard, the module housing 220 may include a metal material, such as steel or aluminum.

In particular, when the module housing 220 includes a metal material including aluminum, heat generated in the cell assembly 100 may be effectively discharged outside the module housing 220 by using high heat conductivity of aluminum.

Also, the module housing 220 may include one or more side walls 220a through 220d.

In particular, the plurality of side walls 220a through 220d may be connected to each other. For example, when viewed from the direction indicated by the arrow F, the side walls 220a through 220d may include a top wall 220a, a bottom wall 220b, a left wall 220c, and a right wall 220d based on the cell assembly 100, which are connected to each other.

The module housing 220 may have an internal space defined by the side walls 220a through 220d to accommodate the cell assembly 100 therein. In particular, the internal space may have an internal structure corresponding to an outer shape of the cell assembly 100.

For example, as shown in FIG. 2, the module housing 220 may have a structure in which the top and bottom walls 220a and 220b of the module housing 220 are connected to the left and right walls 220c and 220d at right angles such that the cell assembly 100 whose rough overall shape is a rectangular parallelepiped is accommodated therein.

Moreover, the internal space may be provided such that at least one of the top wall 220a, the bottom wall 220b, the left wall 220c, and the right wall 220d of the module housing 220 contacts at least one side surface of the cell assembly 100. In other words, the heat generated in the cell assembly 100 may be effectively transferred to the module housing 220 when the area where the side walls 220a through 220d of the module housing 220 and the outer surface of the cell assembly 100 directly contact each other is increased.

For example, as shown in FIG. 2, the module housing 220 may be provided such that the top wall 220a, the bottom wall 220b, the left wall 220c, and the right wall 220d contact a top surface, a bottom surface, a left surface, and a right surface of the cell assembly 100.

Also, the module housing 220 may have a hollow structure in which the internal space is opened in both directions. In particular, the hollow structure may be configured such that, when the plurality of battery modules 200 are arranged in a front-and-back direction, the internal space is opened along an arranged direction of the battery module 200.

In particular, the module housing 220 may be configured as a mono frame in which the top wall 220a, the bottom wall 220b, the left wall 220c, and the right wall 220d are integrated.

Here, an integrated shape denotes a shape in which one body is configured by using a casting method or the like. In particular, both end portions of the top wall 220a, bottom wall 220b, left wall 220c, and right wall 220d of the module housing 220 may be connected to each other.

For example, as shown in FIG. 2, the module housing 220 may have a quadrangular tube shape opened in the front-and-back direction and in which the both end portions of the top wall 220a, bottom wall 220b, left wall 220c, and right wall 220d are connected to each other.

As such, according to such a configuration of the present disclosure, by forming the module housing 220 to surround the side surfaces of the cell assembly 100, heat generated in the cell assembly 100 during charging and discharging of the battery module 200 may be effectively discharged to the outside.

Referring back to FIGS. 1 and 2, the end frame 230 may include a body frame 232 and a coupling plate 236.

Here, the body frame 232 may include a main wall 232a. In other words, the main wall 232a may have a plate shape erected in the up-and-down direction. Also, a module terminal (not shown) may be provided at the main wall 232a such as to provide electric connection between the cell assembly 100 and an external device.

Also, the body frame 232 may include one or more side walls 233 extending from an outer circumference of the main wall 232a in a direction where the module housing 220 is positioned. In particular, when viewed from the direction indicated by the arrow F, the body frame 232 may include an upper wall 233a, a lower wall 233b, a left wall 233c, and a right wall 233d based on the center of the main wall 232a. Moreover, the upper, lower, left, and right walls 233a through 233d may be connected to each other.

Moreover, the body frame 232 may function as an exterior material with respect to the battery module 200. Accordingly, the body frame 232 may provide structural stability to the battery module 200 and protect components accommodated therein, such as the cell assembly 100, from an impact or another external physical element, such as a foreign substance. In this regard, the body frame 232 may include a metal material, such as steel or aluminum. Alternatively, the body frame 232 may include an electric insulating material. For example, the body frame 232 may include a plastic material, such as polyvinyl chloride (PVC).

In addition, one side portion of the coupling plate 236 may be combined and fixed to the side wall 233 of the body frame 232. In other words, the coupling plate 236 may be divided into a front portion and a rear portion based on a line at a predetermined position in the left-and-right direction on the coupling plate 236, and the front portion or the rear portion of the coupling plate 236 may be combined and fixed to the outer surface of the side wall 233 of the body frame 232.

Also, the coupling plate 236 may be configured such that, when the front portion of the coupling plate 236 is combined and fixed to the outer surface of the side wall 233 of the body frame 232, the rear portion is combined to the front end portion of the module housing 220. On the other hand, when the rear portion of the coupling plate 236 is combined and fixed to the outer surface of the side wall 233 of the body frame 232, the front portion may be combined to the rear end portion of the module housing 220.

And, the coupling plate 236 may include a metal material, such as steel or aluminum.

Figure 3:
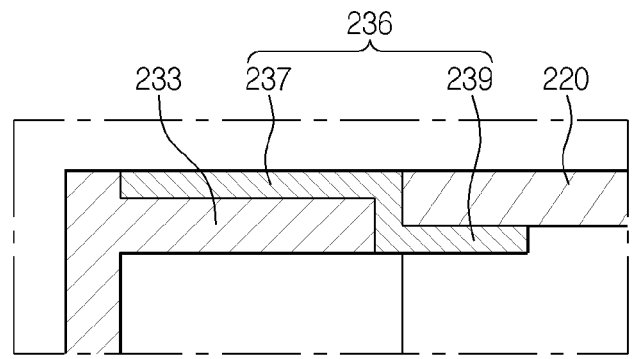
FIG. 3 is a partial cross-sectional view schematically showing a cross section of a battery module taken along a line A-A' of FIG. 1.

FIG. 3 is a partial cross-sectional view schematically showing a cross section of a battery module taken along a line A-A' of FIG. 1. Also, FIG. 4 is a perspective view schematically showing a coupling plate that is a partial component with respect to a battery module according to an embodiment of the present disclosure.

Figure 4:
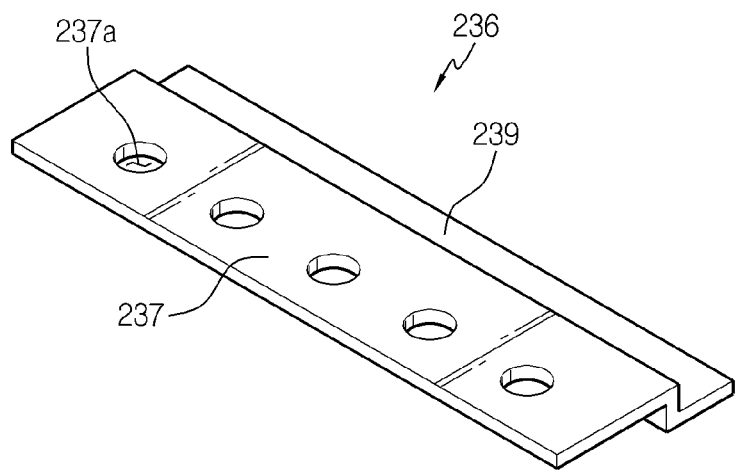
FIG. 4 is a perspective view schematically showing a coupling plate that is a partial component with respect to a battery module according to an embodiment of the present disclosure.

Referring to FIGS. 2 through 4, the coupling plate 236 may include a body portion 237 combined to the side wall 233 of the body frame 232. Here, the body portion 237 may have a plate shape whose top and bottom surfaces are relatively wide compared to side surfaces. For example, the body portions 237 of the four coupling plates 236 are respectively combined to four side walls, i.e., the upper, lower, left, and right walls 233a through 233d of the body frame 232.

As such, according to such a configuration of the present disclosure, in the coupling plate 236, since the body portion 237 having the surface relatively wide compared to side portions is combined to one side wall 233 of the body frame 232, the coupling plate 236 may be combined to the body frame 232 with high combining force.

Moreover, the coupling plate 236 may include a stepped portion 239 having a stepped structure extending from the body portion 237 in a center direction of the end frame 230. Also, the stepped portion 239 may extend from a side end portion of the body portion 237 such as to adhere to an inner surface of the module housing 220.

For example, as shown in FIGS. 3 and 4, the coupling plate 236 combined to the upper wall 233a of the body frame 232 includes the body portion 237 and the stepped portion 239 extending from the body portion 237. Also, a top surface of the stepped portion 239 may be inserted into the internal space of the module housing 220 to adhere to the inner surface of the module housing 220.

Figure 5:
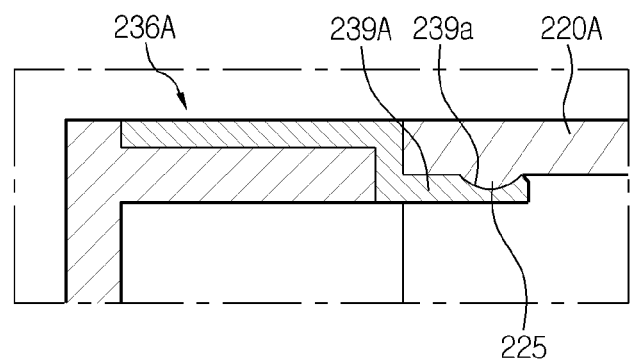
FIG. 5 is a partial vertical cross-sectional view schematically showing a module housing and a coupling plate with respect to a battery module according to another embodiment of the present disclosure.

FIG. 5 is a partial vertical cross-sectional view schematically showing a module housing and a coupling plate with respect to a battery module according to another embodiment of the present disclosure.

Referring to FIG. 5, compared with the configuration of the module housing 220 of FIG. 3, at least one fixing protrusion 225 protruding in a direction where a stepped portion 239A is positioned may be further formed on an inner surface of a module housing 220A facing the stepped portion 239A.

Also, compared with the configuration of the coupling plate 236 of FIG. 3, in a coupling plate 236A of FIG. 5, at least one fixing groove 239a recessed such that the fixing protrusion 225 of the module housing 220A is inserted may be formed on the stepped portion 239A.

As such, according to such a configuration of the present disclosure, by combining the fixing protrusion 225 of the module housing 220A and the fixing groove 239a of the stepped portion 239A, the coupling plate 236 may be guided to be positioned at a proper position of the inner surface of the module housing 220A, and thus an installation process is facilitated. Also, a combined structure of the fixing protrusion 225 and the fixing groove 239a may prevent detachment of the end frame 230 after being combined with the module housing 220A.

Figure 6:
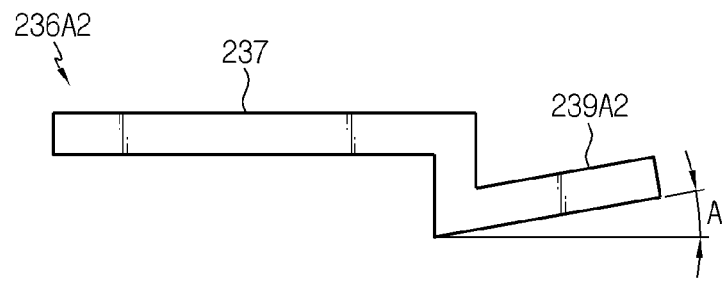
FIG. 6 is a side view schematically showing a coupling plate that is a partial component with respect to a battery module according to another embodiment of the present disclosure.

FIG. 6 is a side view schematically showing a coupling plate that is a partial component with respect to a battery module according to another embodiment of the present disclosure.

Referring to FIG. 6 together with FIG. 2, in a coupling plate 236A2, a stepped portion 239A2 may extend to be inclined from the body portion 237 of the coupling plate 236A2 in a direction where the inner surface of the module housing 220 is positioned such as to pressurize the inner surface of the module housing 220.

For example, as shown in FIG. 6, the coupling plate 236A2 may be combined to an upper wall (the side wall 233 of FIG. 3) of the body frame 232 of FIG. 2, and the stepped portion 239A2 may extend to be inclined at a predetermined angle A from the body portion 237 in an upward direction. In other words, when the coupling plate 236A2 is inserted to adhere to the inner surface of the module housing 220, the stepped portion 239A2 inclined in the upward direction may pressurize the inner surface of the module housing 220 in the upward direction.

As such, according to such a configuration of the present disclosure, since the stepped portion 239A2 extending to be inclined from the body portion 237 may be positioned to pressurize the inner surface of the module housing 220, the stepped portion 239A2 may be further adhered to the inner surface of the module housing 220 and welding between the stepped portion 239A2 and the module housing 220 is further facilitated, thereby increasing welding reliability.

Figure 7:
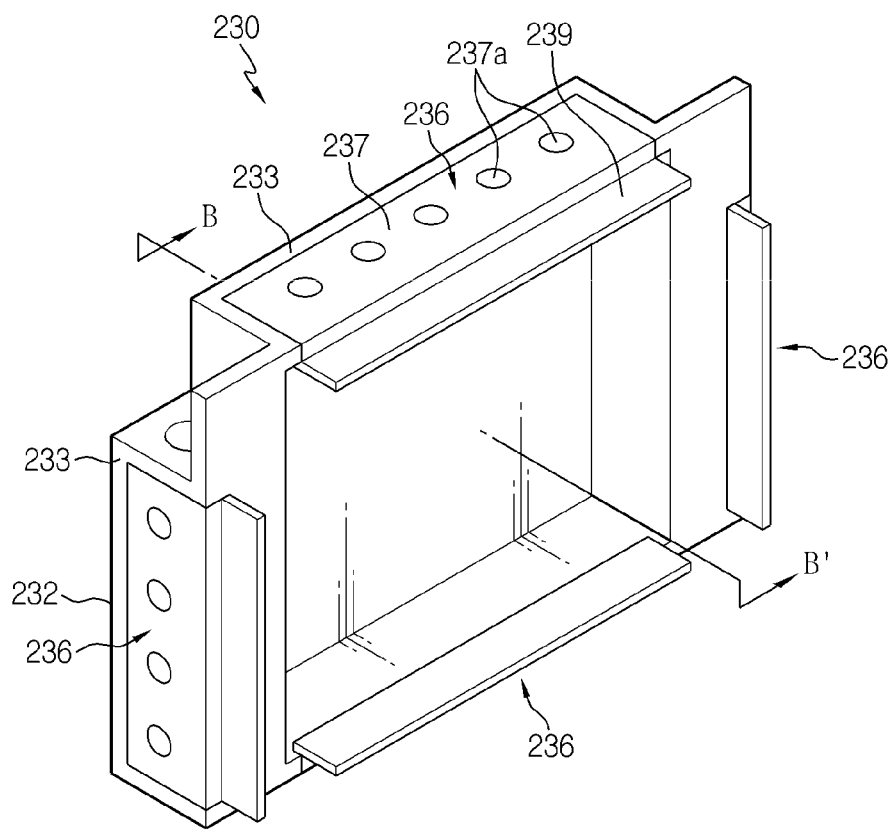
FIG. 7 is a perspective view schematically showing an end frame that is a partial component with respect to a battery module according to an embodiment of the present disclosure.

FIG. 7 is a perspective view schematically showing an end frame that is a partial component with respect to a battery module according to an embodiment of the present disclosure. Also, FIG. 8 is a vertical cross-sectional view schematically showing a cross section of a battery module taken along a line B-B' of FIG. 7.

Figure 8:
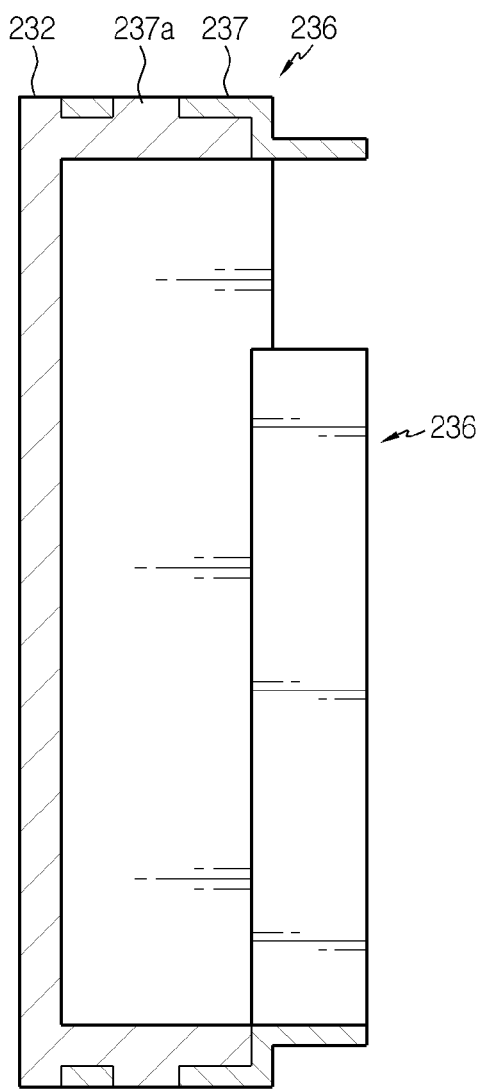
FIG. 8 is a vertical cross-sectional view schematically showing a cross section of a battery module taken along a line B-B' of FIG. 7.

Referring to FIGS. 7 and 8, the body frame 232 of the end frame 230 may be manufactured via a casting method. Here, the casting method may be, for example, a die-casting method, and the die-casting method is performed by heating and melting a metal material and then injecting the melted material in a mold of a desired shape to manufacture a casting. When the body frame 232 is manufactured via the casting method, a complicated structure may be formed with precision without an additional finishing work.

Also, the coupling plate 236 may be manufactured by performing insert injection molding on the body frame 232. In particular, according to a manufacturing method using the insert injection molding, the coupling plate 236 may be manufactured by pre-arranging the coupling plate 236 inside a mold for casting the body frame 232, injecting a melted material of the body frame 232 into the mold, and then solidifying the melted material such that the body portion 237 of the coupling plate 236 is combined to the side wall 233 of the body frame 232.

Moreover, the coupling plate 236 may be manufactured via press or extrusion molding. Accordingly, when insert injection molding is performed on the coupling plate 236 together with the body frame 232, the temperature of a melted material of the body frame 232 is transmitted to the outer surface of the coupling plate 236, and thus a material of the side wall 233 of the body frame 232 and a material of the body portion 237 of the coupling plate 236 may be fused and combined while being mixed with each other.

As such, according to such a configuration of the present disclosure, a complicated shape of the body frame 232 may be formed by using a casting method, and by forming the coupling plate 236 via press or extrusion molding to be combined with the body frame 232, a defect occurred during a welding process between the module housing 220 and the end frame 230 is effectively reduced, thereby improving weldability.

Moreover, at least one fixing hole 237a may be formed at the body portion 237 of the coupling plate 236. Also, a portion of the side wall 233 of the body frame 232 may be embedded inside the fixing hole 237a. In other words, the fixing hole 237a of the coupling plate 236 may be formed such that the body portion 237 of the coupling plate 236 and the side wall 233 of the body frame 232 are combined to each other.

Moreover, when the insert injection molding is performed on the coupling plate 236 via the casting method of the body frame 232, the melted material of the body frame 232 may be embedded inside the fixing hole 237a of the coupling plate 236 and then hardened.

For example, as shown in FIG. 7, five fixing holes 237a may be formed at the body portion 237 of the coupling plate 236 and one region of the side wall 233 of the body frame 232 may be embedded in the fixing hole 237a, thereby forming a combining structure with the coupling plate 236.

As such, according to such a configuration of the present disclosure, the coupling plate 236 and the body frame 232 may have strong binding force by manufacturing the body frame 232 via the casting method, without having to separately use a coupling member. Accordingly, not only manufacturing costs may be reduced by reducing the number of components, but also a coupling work may be omitted, and thus a manufacturing time is reduced and a stable combining structure is provided.

Figure 9:
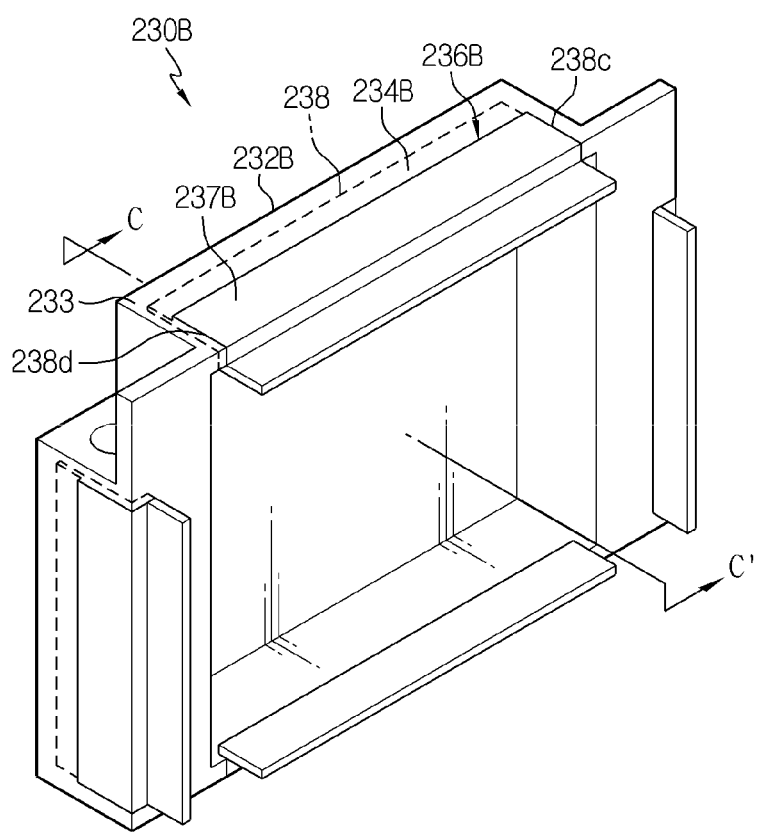
FIG. 9 is a perspective view schematically showing an end frame with respect to a battery module according to another embodiment of the present disclosure.

FIG. 9 is a perspective view schematically showing an end frame with respect to a battery module according to another embodiment of the present disclosure. Also, FIG. 10 is a vertical cross-sectional view schematically showing a cross section of a battery module taken along a line C-C' of FIG. 9.

Figure 10:
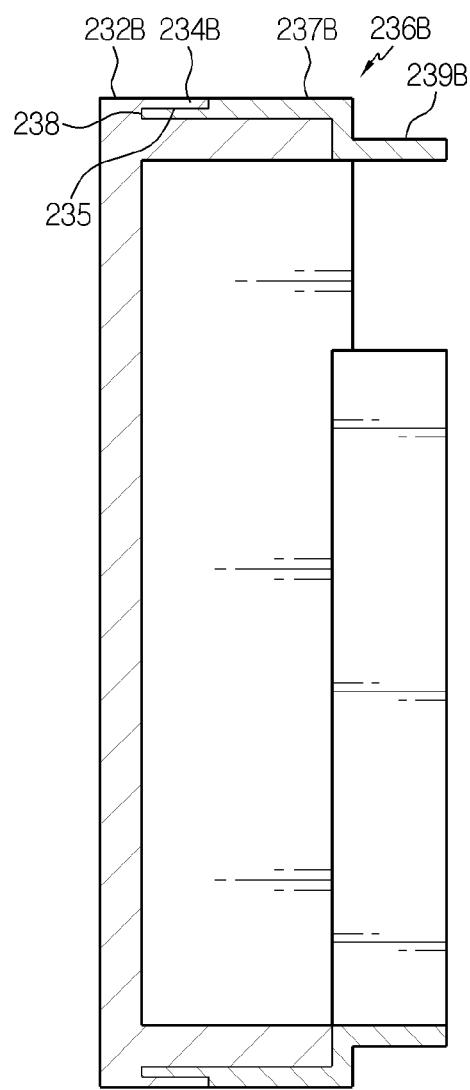
FIG. 10 is a vertical cross-sectional view schematically showing a cross section of a battery module taken along a line C-C' of FIG. 9.

Referring to FIGS. 9 and 10, for the end frame 230B, a recessed portion 235 whose one region of an outer surface is recessed in an inward direction and a recessed region extends from one end to the other end may be formed on a body portion 237B of a coupling plate 236B. In other words, the recessed portion 235 may be a portion where the thickness of one region of the body portion 237B of the coupling plate 236B is thin.

Also, an embedded fixing portion 234B may be formed at the recessed portion 235 as a portion of the side wall 233 of a body frame 232B is embedded. In other words, when insert injection molding is performed on the coupling plate 236B with the body frame 232B, a portion of the body frame 232B may be embedded in the recessed portion 235.

Moreover, since the recessed portion 235 extends from one end to the other end of the body portion 237B, the embedded fixing portion 234B extends from the one end to the other end of the body portion 237B of the coupling plate 236B, thereby forming a structure connected to the side wall 233 of the body frame 232B.

In particular, the recessed portion 235 may be formed at a side end portion 238 of the body portion 237B, which does not contact a stepped portion 239B. In particular, the recessed portion 235 may be formed at the side end portion 238 of the body portion 237B of the coupling plate 236B in an opposite direction of a direction where the stepped portion 239B is positioned.

Alternatively, although not illustrated in FIG. 9, when the recessed portion 235 is formed on a left side end portion 238c and a right side end portion 239d of the body portion 237B of the coupling plate 236B in the left-and-right direction, the embedded fixing portion 234B may extend from the side wall 233 of the body frame 232B and be formed at the left side end portion 238c and the right side end portion 238d of the coupling plate 236B.

For example, as shown in FIG. 10, the recessed portion 235 may be formed at the side end portion 238 facing the front of the body portion 237B of the coupling plate 236B, which is the opposite direction of the direction where the stepped portion 239B is positioned. Also, the embedded fixing portion 234B may be formed at the side end portion 238 facing the front of the body portion 237B of the coupling plate 236B by extending from the side wall 233 of the body frame 232B.

As such, according to such a configuration of the present disclosure, since the embedded fixing portion 234B is formed integrally with the body frame 232B, when the coupling plate 236B is inserted into the module housing 220, detachment of the coupling plate 236B from the body frame 232B may be effectively prevented as the stepped portion 239B is pressurized in the center direction of the end frame 230.

Figure 11:
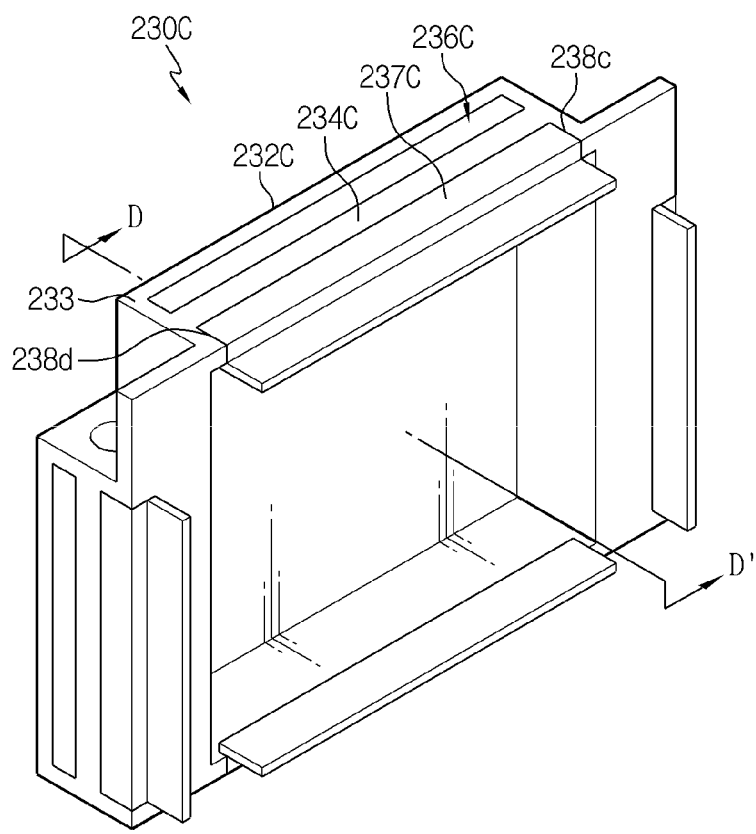
FIG. 11 is a perspective view schematically showing an end frame with respect to a battery module according to another embodiment of the present disclosure.

FIG. 11 is a perspective view schematically showing an end frame with respect to a battery module according to another embodiment of the present disclosure. Also, FIG. 12 is a vertical cross-sectional view schematically showing a cross section of a battery module taken along a line D-D' of FIG. 11.

Figure 12:
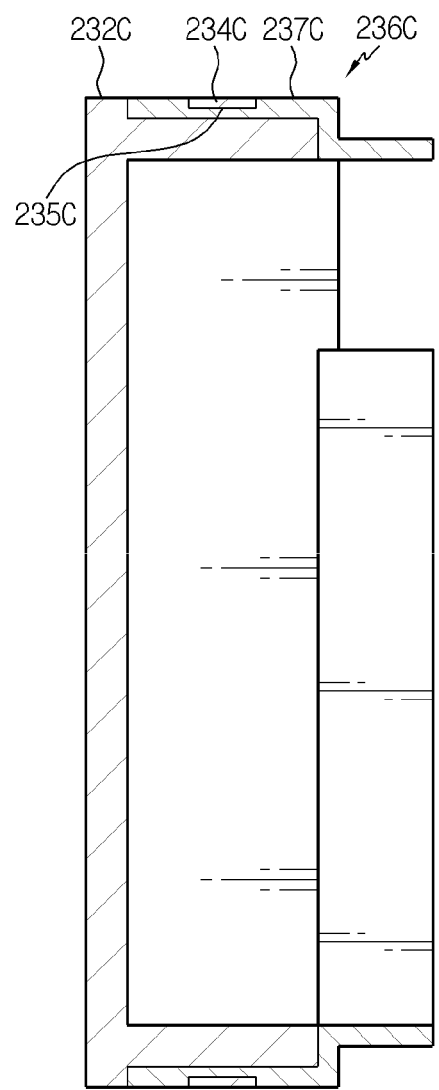
FIG. 12 is a vertical cross-sectional view schematically showing a cross section of a battery module taken along a line D-D' of FIG. 11.

Referring to FIGS. 11 and 12, for the end frame 230C, a recessed portion 235C may extend from the center of an outer surface of a body portion 237C of a coupling plate 236C to the left side end portion 238c and the right side end portion 238d. Accordingly, an embedded fixing portion 234C may be connected to the side wall 233 of a body frame 232C by extending from the center of the coupling plate 236C to the left side end portion 238c and the right side end portion 238d.

For example, as shown in FIG. 12, the recessed portion 235C may extend from the center of the outer surface of the body portion 237C of the coupling plate 236C to the left side end portion 238c and the right side end portion 238d. Also, the embedded fixing portion 234C may be connected to the side wall 233 of the body frame 232C by extending from the center of the coupling plate 236C to the left side end portion 238c and the right side end portion 238d.

As such, according to such a configuration of the present disclosure, compared with the embedded fixing portion 234C of FIG. 9, the embedded fixing portion 234C formed at the center of the body portion 237C of the coupling plate 236C may stably prevent the coupling plate 236C from being detached from the side wall 233 of the body frame 232C.

Figure 13:
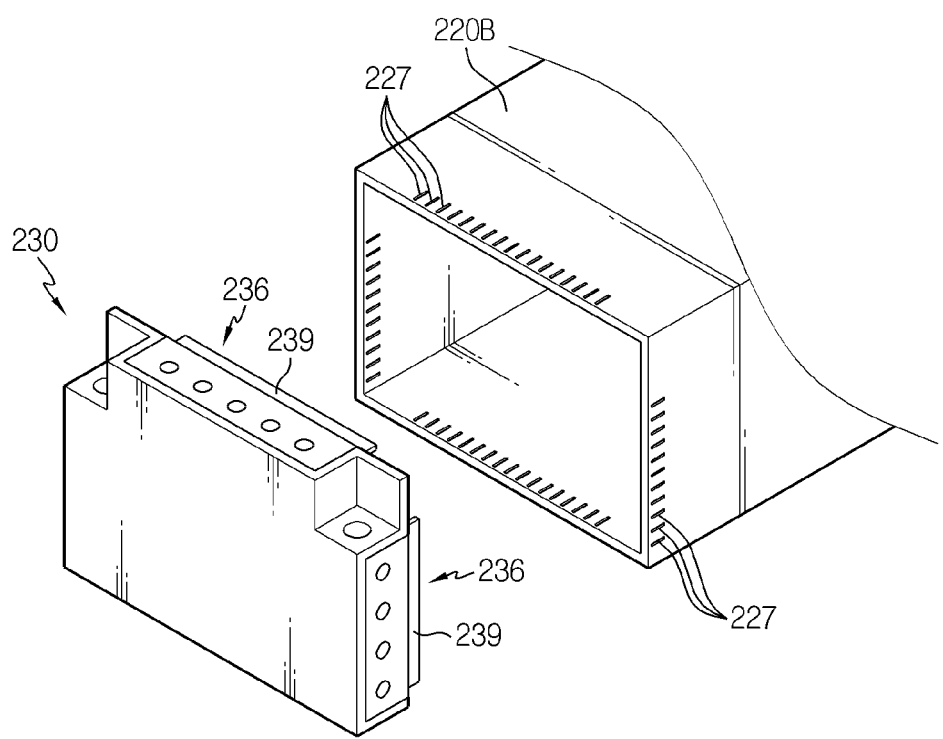
FIG. 13 is a perspective view schematically showing partial components with respect to a battery module according to another embodiment of the present disclosure.

FIG. 13 is a perspective view schematically showing partial components with respect to a battery module according to another embodiment of the present disclosure.

Referring to FIG. 13, a plurality of slits 227 may be formed at the front end portion and the rear end portion of a module housing 220B welded to the stepped portion 239 of the coupling plate 236. The slit 227 may extend in the front-and-back direction or may extend along the front end portion or the rear end portion of the side wall 233 of the module housing 220B. For example, as shown in FIG. 13, the plurality of slits 227 extending in the front-and-back direction may be formed at the front end portion of the four side walls 233 of the module housing 220B.

As such, according to such a configuration of the present disclosure, since the slit 227 effectively transmits heat up to the stepped portion 239 of the coupling plate 236 during a welding process between the coupling plate 236 and the stepped portion 239, a time of the welding process may be effectively reduced and welding reliability may be increased.

Figure 14:
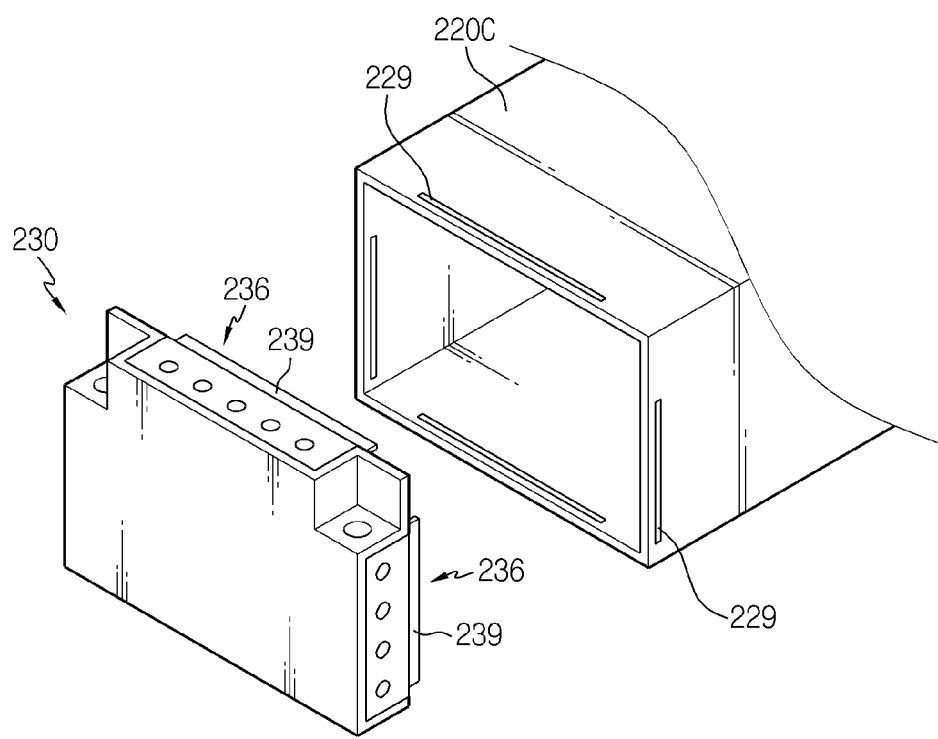
FIG. 14 is a perspective view schematically showing partial components with respect to a battery module according to another embodiment of the present disclosure.

FIG. 14 is a perspective view schematically showing partial components with respect to a battery module according to another embodiment of the present disclosure.

Referring to FIG. 14, a welding guide line 229 may be formed at a front end portion and a rear end portion of a module housing 220C welded to the stepped portion 239 of the coupling plate 236. Here, the welding guide line 229 may have a shape in which a region having the thickness thinner than other region of the front end portion and the rear end portion of the module housing 220C is continuously extending linearly. Also, the welding guide line 229 may extend along the front end portion or the rear end portion of the side wall 233 of the module housing 220C.

For example, as shown in FIG. 14, the welding guide line 229 may be formed on each of the four side walls 233 of the module housing 220C. Here, the welding guide line 229 may extend along the front end portion of the side wall 233 of the module housing 220C.

As such, according to such a configuration of the present disclosure, since the welding guide line 229 not only assists a welding process of an operator, but also enables one region of the module housing 220C, which has a relatively thin thickness, to be quickly welded to the stepped portion 239 of the coupling plate 236, a time of manufacturing processes may be effectively reduced.

Also, a battery pack according to the present disclosure may include at least one battery module 200 according to the present disclosure. Moreover, the battery pack according to the present disclosure may further include, in addition to the battery module 200, a pack case for accommodating the battery module 200 and various devices for controlling charging and discharging of the battery module 200, such as a battery management system (BMS), a current sensor, a fuse, etc.

Also, the battery pack according to the present disclosure may be applied to a vehicle, such as an electric vehicle or a hybrid vehicle. In other words, the vehicle according to the present disclosure may include the battery pack according to the present disclosure.

Meanwhile, in the present specification, the terms indicating directions, such as up, down, left, right, front, and back, are used but it would be obvious to one of ordinary skill in the art that the terms are used only for convenience of description and may vary according to a position of a target object, a position of an observer, or the like.

While the present disclosure has been particularly shown and described with reference to exemplary embodiments thereof, it will be understood by those of ordinary skill in the art that various changes in form and details may be made therein without departing from the scope of the present disclosure as defined by the following claims.

| Reference Signs | |
|---|---|
| 200: battery module | 230: end frame |
| 100: cell assembly | 232: body frame |
| 110: secondary battery | 234: embedded fixing portion |
| 111: electrode lead | 236: coupling plate |
| 220: module housing | 237: body portion |
| 225: fixing protrusion | 239: stepped portion |
| 237a: fixing hole | |

INDUSTRIAL APPLICABILITY

The present disclosure relates to a battery module including an end frame. Also, the present disclosure is applicable to industries related to a battery pack including a plurality of battery modules and an electric part, an electronic device including the battery pack, an energy storage system, or a vehicle.

What is claimed is:

1. A battery module comprising:
a cell assembly comprising a plurality of secondary batteries;
a module housing comprising at least one side wall and configured to accommodate the cell assembly in an internal space defined by the at least one side wall; and
an end frame comprising:
a body frame that comprises a main wall and at least one side wall extending from an outer circumference of the main wall in a direction where the module housing is positioned; and
a coupling plate that is a separate piece from the body frame and is configured such that one side portion of the coupling plate is combined and fitted to the at least one side wall of the body frame and the other side portion of the coupling plate is combined to a front end portion or a rear end portion of the module housing,
wherein the coupling plate comprises a body portion combined and fitted to an outer surface of the at least one side wall of the body frame, a stepped portion having a step with respect to the body portion and extending from a side end portion of the body portion to be adhered to an inner surface of the module housing, and a connection portion communicating with the body portion and the stepped portion on opposites ends of the connection portion, and
wherein the body portion and the stepped portion are parallel to each other, and the connection portion is perpendicular to both the body portion and the stepped portion.

2. The battery module of claim 1, wherein at least one fixing protrusion protruding in a direction where the stepped portion is positioned is formed at the inner surface of the module housing, which faces the stepped portion, and
at least one fixing groove recessed such that the fixing protrusion of the module housing is inserted is formed at the stepped portion.

3. The battery module of claim 1, wherein the stepped portion extends to be inclined from the body portion of the coupling plate in a direction where the inner surface of the module housing is positioned such as to pressurize the inner surface of the module housing.

4. The battery module of claim 1, wherein at least one fixing hole is formed at the body portion of the coupling plate such that one region of the at least one side wall of the body frame is embedded therein.

5. The battery module of claim 1, wherein a recessed portion, in which one region of an outer surface is recessed in an inward direction and a recessed region extends from one end to the other end, is formed at the body portion of the coupling plate, and an embedded fixing portion, in which a portion of the at least one side wall of the body frame is embedded in the recessed portion, is formed at the body frame.

6. The battery module of claim 5, wherein the recessed portion is formed on a side end portion of the body portion, which is not in contact with the stepped portion.

7. The battery module of claim 5, wherein the recessed portion extends from a center of the body portion of the coupling plate to both end portions.

8. The battery module of claim 1, wherein the one side portion of the coupling plate is fitted to the at least one side wall of the body frame by being embedded between portions of the at least one side wall of the body frame.

9. A battery pack comprising at least one battery module according to claim 1.

10. A vehicle comprising the battery pack according to claim 9.

* * * * *